(12) United States Patent
Wang

(10) Patent No.: US 6,244,553 B1
(45) Date of Patent: Jun. 12, 2001

(54) FASTENING DEVICE FOR ELECTRONIC EQUIPMENT

(76) Inventor: Chin-Yang Wang, No. 24-110, Shao-An Tsu, Tainan Hsien (TW)

(*) Notice: Subject to any disclaimer, the term of this patent is extended or adjusted under 35 U.S.C. 154(b) by 0 days.

(21) Appl. No.: 09/495,874

(22) Filed: Feb. 2, 2000

(51) Int. Cl.[7] .................................................. E04G 3/00

(52) U.S. Cl. ...................................... 248/278.1; 379/454

(58) Field of Search .......................... 248/276.1, 278.1, 248/282.1, 289.11; 379/454

(56) References Cited

U.S. PATENT DOCUMENTS

| | | | |
|---|---|---|---|
| 4,797,916 | * | 1/1989 | Kojima .................................. 379/454 |
| 5,109,411 | * | 4/1992 | O'Connell ............................ 379/454 |
| 6,168,126 | * | 1/2001 | Stafford .............................. 248/276.1 |
| 6,173,933 | * | 1/2001 | Whiteside ........................... 248/276.1 |

* cited by examiner

*Primary Examiner*—Ramón O Ramirez
(74) *Attorney, Agent, or Firm*—Bacon & Thomas, PLLC

(57) ABSTRACT

A fastening device for securing an electronic means thereon comprising a base secured to an object in one side, a pivotable member pivotably secured to the other side of base, a connecting member pivotably secured to one side of pivotable member, the pivot direction of connecting member is perpendicular to that of pivotable member, a turning member pivotably secured to connecting member in the side opposing to pivotable member, the pivot direction of the turning member is the same as that of the connecting member, and a support member pivotably secured to turning member in one side and releasably secured to electronic means in the other side, the pivot direction of support member is perpendicular to that of the turning member. Pivotable member, connecting member, turning member, and support member are pivotable to adjust support member to a desired direction and angle. With this, support member with electronic means mounted thereon is in a convenient position for access.

12 Claims, 3 Drawing Sheets

US 6,244,553 B1

FASTENING DEVICE FOR ELECTRONIC EQUIPMENT

FIELD OF THE INVENTION

The present invention relates to fastening device and more particularly to a fastening device for electronic equipment.

BACKGROUND OF THE INVENTION

A conventional fastening device for mobile phone includes a base adhered to a suction member at one side, and a body at the other side of base capable of up/down pivoting about base having a support member at a distal end with respect to base being also up/down pivotable about base. A magnetic member, embedded on support member, may attract to a foreign object by means of an anti-skid pad mounted thereon. In detail, for example, a mobile phone may be put on the anti-skid pad. As such, the magnetic force produced by the magnetic member may attract the battery compartment of mobile phone for securing mobile phone to the pad. Thus, the mobile phone is not susceptible to fall. However the previous design suffered from several disadvantages:

1) The fastening device can only pivot up/down, while horizontal pivoting is not possible. As such, user should first separate suction member from the attached object. Then adjust the horizontal angle of the fastening device to a desired one. Finally, place suction member on the object again. This achieves the task of adjusting the horizontal position of the fastening device with mobile phone mounted thereon. In view of the foregoing, it bothers user very much.

2) The length of body is fixed, i.e., not a telescopic one. As such, such fastening device sometimes may not suit user's needs.

3) The signal receiving performance of mobile phone may be adversely affected because, as stated above, the magnetic force produced by the magnetic member attracts the battery compartment of mobile phone for securing mobile phone thereon. Further, the magnetic force of magnetic member may cause an abnormal operation of electronics of mobile phone and even damage data stored in Subscriber Identity Module (SIM) card of mobile phone which in turn prevents mobile phone from operating normally.

SUMMARY OF THE INVENTION

It is therefore an object of the present invention to provide a fastening device for electronic means comprising a base secured to an object, a pivotable member, a connecting member, a turning member, and a support member. Pivotable member, connecting member, turning member, and support member are pivotable to adjust support member to a desired direction and angle. With this, support member with the electronic means mounted thereon is in a convenient position for access.

The above and other objects, features and advantages of the present invention will become apparent from the following detailed description taken with the accompanying drawings.

DETAILED DESCRIPTION OF THE PREFERRED EMBODIMENTS

Figure 1:
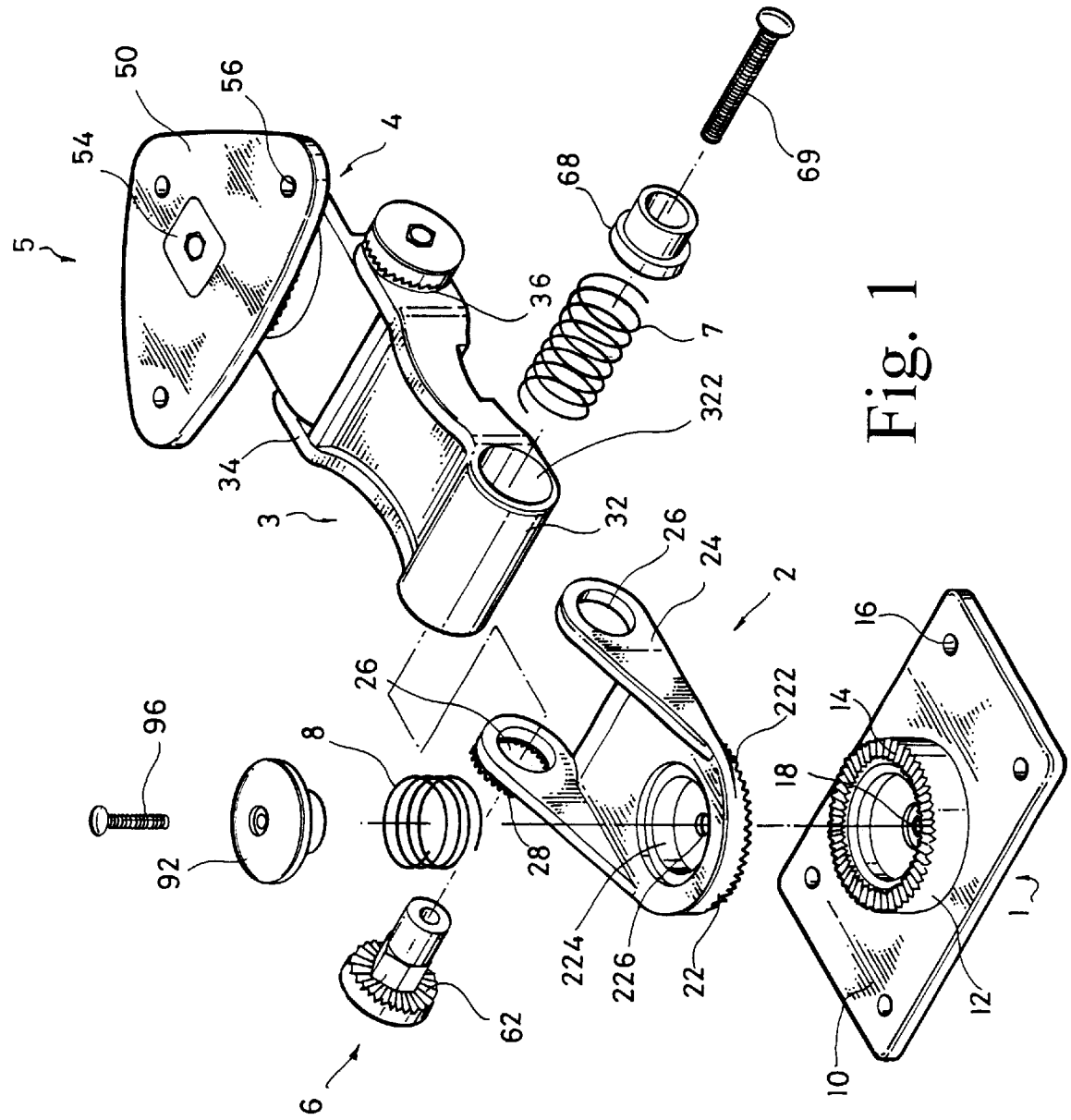
FIG. 1 is an exploded view of a fastening device for electronic means in accordance with the invention.

Referring to FIG. 1, there is shown a fastening device for electronic means constructed in accordance with the invention comprising a base 1 secured to an object, a pivotable member 2 pivotably secured to base 1 in the bottom, a connecting member 3 pivotably secured to one side on the top of pivotable member 2, the pivot direction of connecting member 3 is perpendicular to that of pivotable member 2, a turning member 4 pivotably secured to connecting member 3 in the side opposing to pivotable member 2, the pivot direction of turning member 4 is the same as that of connecting member 3, and a support member 5 pivotably secured to turning member 4 in the side opposing to connecting member 3, the pivot direction of support member 5 is perpendicular to that of turning member 4. An electronic device (not shown) may mount to support member 5 directly or through a fixture (not shown). The electronic device is a mobile phone, a radio transmitter/receiver, or any of other visual displays in this embodiment. It is appreciated by those skilled in the art that any of other suitable devices may be employed without departing from the scope of the invention.

It is designed that pivotable member 2, connecting member 3, turning member 4, and support member 5 are pivotable to adjust support member 5 to a desired direction and angle. As a result, support member 5 with the electronic means mounted thereon is in a convenient position for access.

Figure 3:
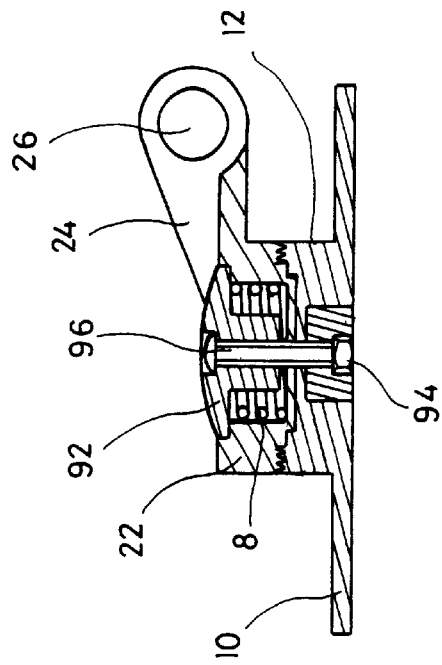
FIG. 3 is a sectional view of the attached base and pivotable member shown in FIG. 2.

Referring to FIGS. 1 and 3, base 1 comprises a rectangular plate 10, a cylindrical member 12 protruded above the center of plate 10 having a toothed member 14 along periphery of the top, a center bore 18 for permitting a bolt to penetrate and secure at the other end by a first fastener 94, and a plurality of holes (four are shown) 16 near corners each allowing a fastening member (not shown) to penetrate so as to secure base 1 to an object. Note that fastening member is a suction cup or a bolt and nut combination in this embodiment. It is appreciated by those skilled in the art that any of other suitable fasteners may be employed in replacement of the suction cup or bolt and nut combination without departing from the scope of the invention.

Pivotable member 2 comprises a cylindrical member 22 protruded downward from the bottom having a circular toothed member 222 matingly engaged with toothed member 14 of base 1, a recess 224, a bore 226 in the center of recess 224 corresponding to the bore 18 of base 1, a pair of opposite braces 24 each protruded on a side having a hole 26, and a circular toothed member 28 provided on the external surface of one brace 24 enclosing the hole 26.

Referring to FIGS. 1, 2, 4, and 5, connecting member 3 comprises a cylindrical member 32 having a polygonal hole (not shown) in one side and a hole 322 in the other side in communication with the polygonal hole, a pair of opposite braces 34 each protruded from the rear having a bore (not specifically shown), and a circular toothed member 36 provided on the external surface of one brace 34 enclosing the bore.

Turning member 4 comprises a member 42 having a polygonal hole (not shown) in one side and a hole (not shown) in the other side matingly engaged with and resembled the shape of the polygonal hole and hole 322 of connecting member 3 respectively, a cylindrical member 44 protruded above having a toothed member along periphery of the top, and a recess (not shown) and a bore (not shown) opposing the toothed member resembled the shape of recess 224 and bore 226 of pivotable member 2 respectively.

Support member 5 comprises a generally triangular plate member 50 on top, a cylindrical member 52 protruded downward with a circular toothed member along periphery of the bottom, a center bore (not shown) in the cylindrical member 52 resembled the shape of center bore 18 of base 10, a first fastener 54 penetrated from top, and a plurality of holes (three are shown) 56 near the corners each allowing a fastening member (not shown) or fixture to penetrate so as to secure support member 5 to an electronic device. Note that fastening member is a suction cup or a bolt and nut combination in this embodiment. It is appreciated by those skilled in the art that any of other suitable fasteners may be employed in replacement of the suction cup or bolt and nut combination without departing from the scope of the invention.

Figure 2:
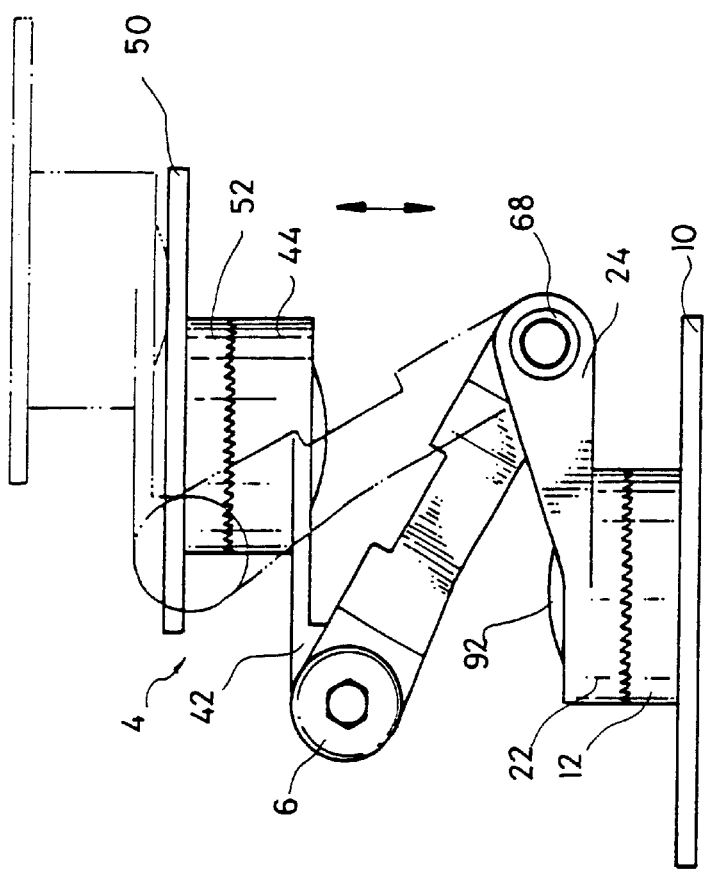
FIG. 2 is a side view illustrating the height adjustment of assembled fastening device shown in FIG. 1.
Figure 4:
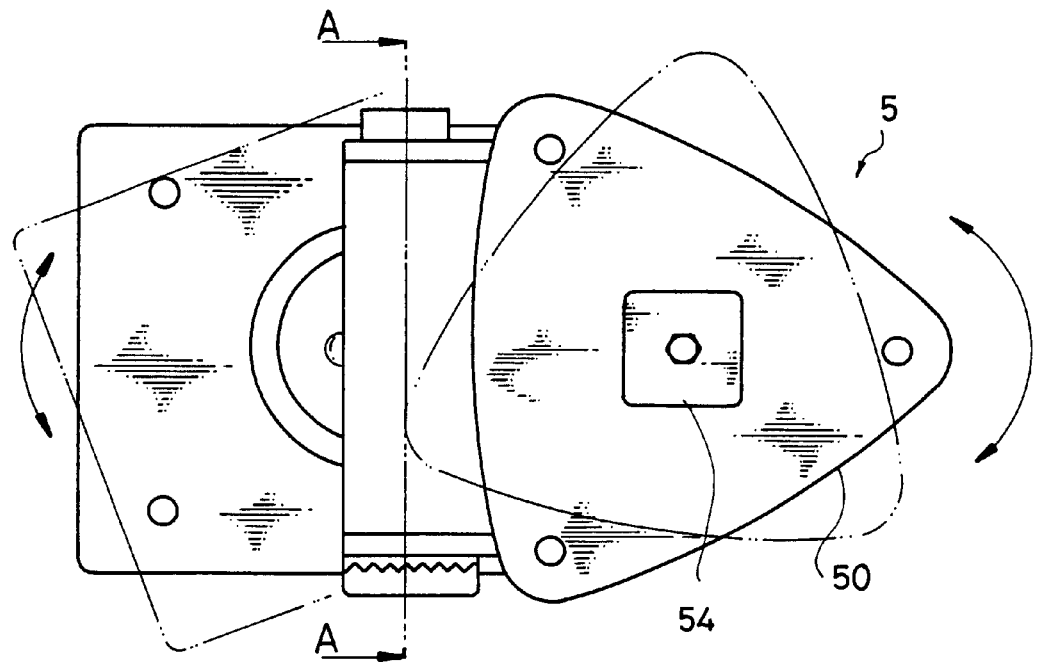
FIG. 4 is a top view illustrating the rotational adjustment of the pivotable member and support member shown in FIG. 2.
Figure 5:
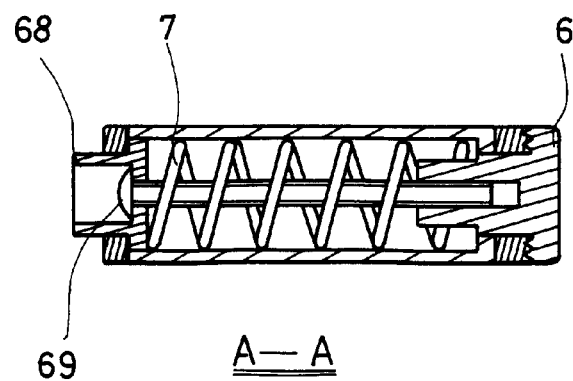
FIG. 5 is a sectional view of cylindrical member taken along line A—A of FIG. 4.

Referring to FIGS. 1, 2, and 5, a description of the assembly of the fastening device of the invention is as below. First, matingly secure toothed member of cylindrical member 12 of base 1 and toothed member of cylindrical member 52 of support member 5 to toothed member of cylindrical member 22 of pivotable member 2 and toothed member of cylindrical member 44 of turning member 4 respectively. Then put a second elastic member 8 in the recess 224 of pivotable member 2. Put a pin 92 on top of second elastic member 8. Screw a second fastener 96 through pin 92, second elastic member 8, bore 226, center bore 18 and secure at the other end by nut 94. As such, base 1 and pivotable member 2 are secured together.

Second elastic member 8 is also provided for buffering the attachment of turning member 4 to support member 5. As such, turning member 4 and support member 5 can be secured together in a manner similar to that decribed above.

It is seen that the pivotable movements of pivotable member 2 with respect to base 1 and support member 5 with respect to turning member 4 are smoothed by the provision of second elastic members 8. Further, pivotable member 2 and support member 5 can maintain at a desired position when rotation stops due to the engagement of toothed members.

As to the attachment of pivotable member 2 to connecting member 3, first align holes 26 of pivotable member 2 with the bore of cylindrical member 32 of connecting member 3. Then insert a stopper member 68 through hole 26 of pivotable member 2 and cylindrical member 32 of connecting member 3,until being stopped by a limiting shoulder. Insert first elastic member 7 into cylindrical member 32 to engage with stopper member 68. Insert the bar portion of pin 6 into polygonal hole of cylindrical member 32 until circular toothed member 62 are engaged with toothed member 28. Finally, screw a second fastener 69 through stopper member 68, first elastic member 7 and secure to the threaded hole of pin 6. As such, pivotable member 2 and connecting member 3 are secured together.

The attachment procedure of connecting member 3 to turning member 4 is similar to that of pivotable member 2 to connecting member 3 described above. In brief, first align holes of connecting member 3 with the bore of turning member 4. Then insert a stopper member 68 through hole of connecting member 3 and cylindrical member of member 42 of turning member 4, until being stopped by a limiting shoulder. Insert first elastic member 7 into member 42 to engage with stopper member 68. Insert the bar portion of pin 6 into member 42 until circular toothed member are engaged with toothed member 36. Finally, screw a second fastener 69 through stopper member 68, first elastic member 7 and secure to the threaded hole of pin 6. As such, connecting member 3 and turning member 4 are secured together.

It is seen that the pivotable movements of connecting member 3 with respect to pivotable member 2 and turning member 4 with respect to connecting member 3 are smoothed by the provision of first elastic members 7. Further, connecting member 3 and turning member 4 can maintain at a desired position when rotation stops due to the engagement of toothed members 28 and 26.

With above construction, base 1 may place on an object such as table or a smooth surface of car by means of fastening members of base 1. Further, support member 5 may secure to telephone directly or cradle for mobile phone by means of fastening members of support member 5. Additionally, pivotable member 2, connecting member 3, turning member 4, and support member 5 are pivotable to adjust support member 5 to a desired position to allow user to conveniently access the telephone or mobile phone mounted on support member 5.

While the invention herein disclosed has been described by means of specific embodiments, numerous modifications and variations could be made thereto by those skilled in the art without departing from the scope and spirit of the invention set forth in the claims.

What is claimed is:

1. A fastening device for securing an electronic means thereon comprising:
   a base secured to a predetermined object in one side;
   a pivotable member pivotably secured to the other side of the base;
   a connecting member pivotably secured to one side of the pivotable member, the pivot direction of the connecting member with respect to the pivotable member is perpendicular to that of the pivotable member with respect to the base;
   a turning member pivotably secured to the connecting member in the side opposing to the pivotable member, the pivot direction of the turning member with respect to the connecting member is the same as that of the connecting member with respect to the pivotable member; and
   a support member pivotably secured to the turning member in one side and releasably secured to the electronic means in the other side, the pivot direction of the support member with respect to the turning member is perpendicular to that of the turning member with respect to the connecting member.

2. The fastening device of claim 1, wherein the base comprises a plate, a cylindrical member protruded above the center of the plate having a toothed member along the periphery of the top, a center bore for permitting a first fastener to penetrate and secure at the other end, and a plurality of holes on the edges each allowing a fastening member to penetrate so as to secure the base to the predetermined object.

3. The fastening device of claim 2, wherein the pivotable member comprises a cylindrical member protruded downward from the bottom having a circular toothed member matingly engaged with the toothed member of the base, a recess, a bore in the center of the recess, a pair of opposite braces each protruded on the side having a hole, and a circular toothed member on the external surface of one of the braces enclosing the hole.

4. The fastening device of claim 3, wherein the connecting member comprises a cylindrical member having a polygonal hole in one side and a hole in the other side in communication with the polygonal hole, a pair of opposite braces each protruded from the rear having a bore, and a circular toothed member on the external surface of one of the braces enclosing the bore.

5. The fastening device of claim 4, wherein the turning member comprises a member having a polygonal hole in one side and a hole in the other side in communication with the polygonal hole, a cylindrical member protruded above having a toothed member along the periphery of the top, a recess opposing the cylindrical member, and a bore in the center of the recess.

6. The fastening device of claim 5, wherein the support member comprises a plate member on the top, a cylindrical member protruded downward with a circular toothed member along the periphery of the bottom, a center bore in the cylindrical member, a first fastener penetrated from the top, and a plurality of holes on the edges each allowing a fastening member to penetrate so as to secure the support member to the electronic means.

7. The fastening device of claim 6, further comprising:
a first elastic member;
a stopper member;
a pin having a bar portion and a toothed portion; and
a second fastener,
wherein insert the stopper member through the hole of the pivotable member and the cylindrical member of the connecting member until in place, insert the first elastic member into the cylindrical member of the connecting member to engage with the stopper member, insert the bar portion of the pin into the polygonal hole of the cylindrical member of the connecting member until the toothed portion of the pin are engaged with the toothed member of the pivotable member, and screw the second fastener through the stopper member, the first elastic member to secure to the bar portion of the pin, thereby securing the pivotable member and the connecting member together.

8. The fastening device of claim 6, further comprising:
a second elastic member provided in the recess of the pivotable member which matingly secures to the base by engaging the toothed member of the pivotable member with the toothed member of the base;
a pin biased against the second elastic member; and
a second fastener,
wherein screw the second fastener through the pin, the second elastic member, the bore of the pivotable member, the center bore of the base and secure at the other end by the first fastener, thereby securing the base and the pivotable member together.

9. The fastening device of claim 6, further comprising:
a second elastic member provided in the recess of the turning member which matingly secures to the support member by engaging the toothed member of the turning member with the toothed member of the support member;
a pin biased against the second elastic member; and
a second fastener,
wherein screw the second fastener through the pin, the second elastic member, the bore of the turning member, the center bore of the support member and secure at the other end by the first fastener, thereby securing the support and the turning member together.

10. The fastening device of claim 6, further comprising:
a first elastic member;
a stopper member;
a pin having a bar portion and a toothed portion; and
a second fastener,
wherein insert the stopper member through the hole of the connecting member and the member of the turning member until in place, insert the first elastic member into the member of the turning member to engage with the stopper member, insert the bar portion of the pin into the polygonal hole of the member of the turning member until the toothed portion of the pin are engaged with the toothed member of the connecting member, and screw the second fastener through the stopper member, the first elastic member to secure to the bar portion of the pin, thereby securing the turning member and the connecting member together.

11. The fastening device in any one of claims 6 to 10, wherein the fastening member is a bolt and nut combination.

12. The fastening device in any one of claims 2 to 10, wherein the fastening member is a suction cup.

* * * * *